(12) United States Patent
Obeng

(10) Patent No.: US 10,565,857 B1
(45) Date of Patent: Feb. 18, 2020

(54) ALARM SYSTEM

(71) Applicant: Francis Obeng, Worcester, MA (US)

(72) Inventor: Francis Obeng, Worcester, MA (US)

(*) Notice: Subject to any disclaimer, the term of this patent is extended or adjusted under 35 U.S.C. 154(b) by 0 days.

(21) Appl. No.: 16/038,490

(22) Filed: Jul. 18, 2018

(51) Int. Cl.
*G08B 25/01* (2006.01)
*G08B 25/00* (2006.01)
*G06F 21/32* (2013.01)

(52) U.S. Cl.
CPC .......... *G08B 25/016* (2013.01); *G06F 21/32* (2013.01); *G08B 25/008* (2013.01); *G08B 25/009* (2013.01)

(58) Field of Classification Search
None
See application file for complete search history.

(56) References Cited

U.S. PATENT DOCUMENTS

| | | | | |
|---|---|---|---|---|
| 3,158,850 | A | 11/1964 | Poznanski | |
| 6,809,642 | B1* | 10/2004 | Brenner | G08B 7/062 340/3.1 |
| 2002/0038818 | A1* | 4/2002 | Zingher | G06K 9/00597 235/381 |
| 2002/0109586 | A1* | 8/2002 | Showell | B60Q 1/38 340/384.1 |
| 2004/0239498 | A1* | 12/2004 | Miller | G08B 25/016 340/539.13 |
| 2005/0280529 | A1* | 12/2005 | Hinkson | G08B 3/10 340/539.1 |
| 2007/0293186 | A1* | 12/2007 | Lehmann | G08B 13/19621 455/404.2 |
| 2008/0190749 | A1* | 8/2008 | Poyner | G07C 9/00158 200/334 |
| 2008/0283442 | A1* | 11/2008 | Hevy | G08B 25/12 206/588 |
| 2010/0267361 | A1* | 10/2010 | Sullivan | G01S 19/17 455/404.2 |
| 2014/0120977 | A1* | 5/2014 | Amis | H04W 4/023 455/521 |
| 2014/0218537 | A1* | 8/2014 | Nepo | G08B 15/004 348/158 |
| 2014/0253326 | A1* | 9/2014 | Cho | G08B 25/10 340/539.13 |
| 2014/0327540 | A1* | 11/2014 | Shin | G08B 21/0446 340/539.11 |
| 2014/0337634 | A1* | 11/2014 | Starner | H04L 9/3231 713/186 |
| 2015/0156567 | A1* | 6/2015 | Oliver | H04W 4/80 340/870.07 |
| 2015/0334530 | A1* | 11/2015 | Scott | G06Q 50/22 455/456.1 |

(Continued)

*Primary Examiner* — Chico A Foxx
(74) *Attorney, Agent, or Firm* — Sanchelima & Associates, P.A.; Christian Sanchelima; Jesus Sanchelima

(57) ABSTRACT

The present invention is an alarm system which verifies a user identity before allowing activation of the alarm therefrom. The alarm system may include an alarm device which is used for biometric verification and activation of the alarm, and a control panel which readily provides information about one or more sounded-off alarms. In particular, the alarm device includes a biometric verification unit which may be a fingerprint reader having a touchscreen which uses a fingerprint of the user for verification purposes. The alarm device may be in the form of a fixed device to be secured in a user's desired location in the premises or a portable device to be carried by the user.

7 Claims, 4 Drawing Sheets

(56) References Cited

U.S. PATENT DOCUMENTS

| | | | |
|---|---|---|---|
| 2015/0379834 A1* | 12/2015 | Datta | G08B 15/004 |
| | | | 340/384.7 |
| 2016/0084614 A1* | 3/2016 | Ellingson | A45C 11/24 |
| | | | 224/243 |
| 2016/0346597 A1* | 12/2016 | O'Mara | A63B 22/0242 |
| 2017/0039841 A1* | 2/2017 | Wilson | G08B 13/19656 |
| 2017/0154518 A1* | 6/2017 | Prabhakar | G08B 21/12 |
| 2018/0122220 A1* | 5/2018 | Billig | G08B 13/19656 |

* cited by examiner

ALARM SYSTEM

BACKGROUND OF THE INVENTION

1. Field of the Invention

The present disclosure generally relates to an alarm system, and more particularly, relates to an alarm system with a fingerprint identification unit for preventing misuse thereof.

2. Description of the Related Art

Alarm devices are commonly used in private places like homes, offices and business, such as banks, to provide a means for sounding an alarm in case of an emergency, such as a burglary attempt or when a fire occurs. These alarm devices sound off the alarm at a remote location, such as in a central security room of an apartment building or a police station as configured, so that the security personnel from central security room and/or the police personnel in the police station can be notified of the emergency and they could arrive at the emergency scene to prevent the miss happening. For example, the police can then send an officer to the concerned residence or building to apprehend a burglar before the burglar has had the opportunity to cause any damage to property or person.

Typically, most of the available alarm devices provide a panic button which needs to be pressed for generating the alarm. For instance, Applicant believes that a related reference corresponds to U.S. Pat. No. 3,158,850 which discloses a burglar alarm system comprising an alarm, an electrical alarm actuator having an electric circuit, first and second switches connected in series in the electric circuit of the alarm actuator, an electrical time delay first switch actuator operable by a control circuit actuated by the second switch, a noise responsive actuator operating the second switch, the noise responsive actuator being operable by a first noise signal to actuate the second switch which activates the control circuit of the time delay actuator whereupon the latter operates the first switch after a predetermined time delay following the first noise signal, a subsequent noise signal after said predetermined time delay again operating the noise responsive actuator to actuate the second switch whereby to activate the electric circuit of the alarm actuator, a third switch connected in said control circuit of the time delay actuator, and a second electrical time delay actuator operating the third switch, the second time delay actuator also being operable by said control circuit of the first named time delay actuator and being operable after a predetermined time delay longer than the time delay of the first named time delay actuator to operate the third switch and deactivate the first and second time delay actuators.

It may be understood that such panic button needs to be located centrally and in a convenient location, in the home or business, so that the user can reach the panic button easily in case of an emergency. But such requirement also results in easy access to the panic button to other persons, like guests and kids in a home, or co-workers and employees in a business establishment. However, these other persons may not necessarily be aware about the purpose and the effect of the pressing of such panic button, and might press the button advertently or inadvertently. This inadvertent pressing of the panic button may result in initiation and sounding of an unwanted alarm which is undesirable and could even be troublesome. For example, the unwanted alarm may lead to the alert of the security personnel who may storm into the home apartment which could lead to damage. Further, on realizing that there is no emergency situation, the security agency could impose a fine, or even terminate service contract, for all the hassle caused due to use of the system without any emergency.

Thus, there is needed of an alarm system which can verify the user and only allow the verified user to control activation of the alarm. Documents describing the closest subject matter provide for a number of more or less complicated features that fail to solve the problems described above in an efficient and economical way. None of the documents suggest the novel features of the present invention.

SUMMARY OF THE INVENTION

It is one of the main objectives of the present invention to provide an alarm system which verifies a user identity before allowing activation of the alarm therefrom.

It is another objective of the present invention to provide an alarm system with a central control panel which readily provides information about one or more sounded-off alarms.

It is yet another objective of the present invention to provide an alarm system which is of relatively simple design, is easily operated, cost-effective, reliable and further easy to manufacture.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Figure 1:
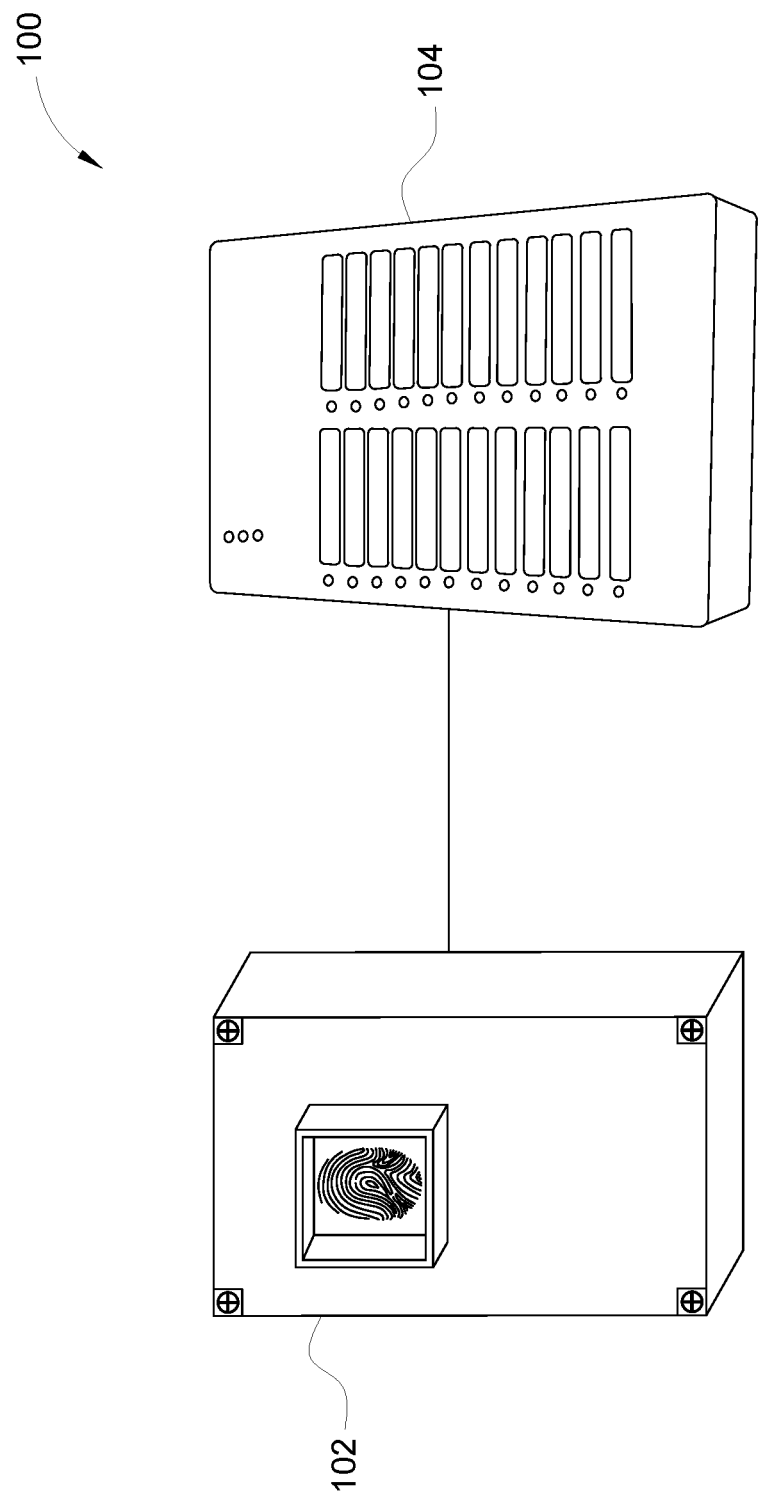
FIG. 1 illustrates a schematic view of an alarm system 100 having an alarm device 102 and a control panel 104 in communication with each other, in accordance with one or more embodiments of the present invention.

Referring to the drawings, FIG. 1 illustrates a schematic view of an alarm system (referred generally by the numeral 100), in accordance with one or more embodiments of the present invention. The alarm system 100 provides means or method by which user's premises are secured through a system of interworking components and devices. Herein, the premises may include home, apartment in a building, business like a store or a bank, an office building and the like. Further, the alarm system 100 may be implemented for personal safety, for example by a user roaming in a street in case of a personal attack, like a burglary attempt. The alarm system 100 of the present disclosure is wireless and works in conjunction with Wireless Internet, such as Wi-Fi available in the user's premises and/or wireless connectivity by means of Bluetooth provided by user's smartphone or the like.

As illustrated in FIG. 1, the alarm system 100 includes an alarm device 102 and a control panel 104. The alarm device 102 and the control panel 104 are disposed in communication with each other by wired or wireless means. For example, in case of implementation of the alarm system 100 for various apartments located in a building, one or more alarm devices 102 may be provided and installed in each of the various apartments in the building; and the control panel 104 may be installed in a central security room of the building where one or more security personnel, such as building guards, are usually present. In such implementation, the alarm device 102 and the control panel 104 may communicate over a wired network of the building. In another example, the alarm system 100 may be implement for personal security. In such case, the alarm device 102 may be a portable device to be carried by the user, and utilizes mobile internet from user's smartphone to communicate with the control panel 104 which may be located remotely in an office of a contracted security agency and the like.

Figure 2:
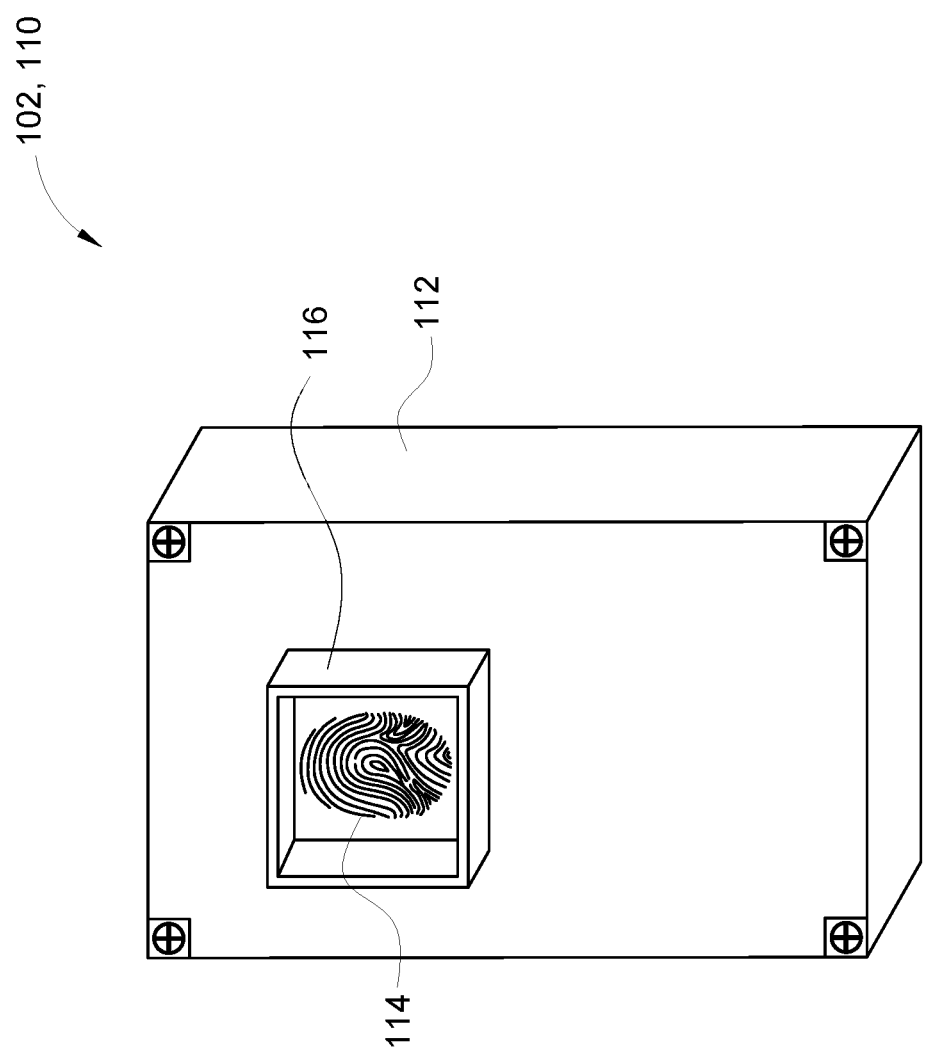
FIG. 2 illustrates a diagrammatic view of the alarm device 102 adapted to be secured to a desired location in user's premises, in accordance with one or more embodiments of the present invention.

FIG. 2 illustrates a diagrammatic view of an alarm device 102, in accordance with a first embodiment of the present disclosure. In the present embodiment, the alarm device 102 is a hold-up alarm device 110 which can be mounted quickly and easily in discreet locations. For example, the alarm device 110 may be mounted under a counter or money drawer for inconspicuous operation. The alarm device 110 may be available as a hardwired or wireless unit. The alarm device 110 may be powered by main electrical supply available in the user's premise. As illustrated in FIG. 2, the alarm device 110 includes a housing 112 which is generally cuboidal in shape. The housing 112 may include circuit board (not shown) located inside thereof which may generate panic signal upon activation, and communicate the generated panic signal with the corresponding control panel 104, in the alarm system 100.

In one or more embodiments of the present disclosure, the alarm device 110 includes a biometric verification unit 114. The biometric verification unit 114 may be one of a known type which recognizes the fingerprints, face, eyes, skin texture, voice or other sound, of the user preconfigured therein. In an embodiment, the biometric verification unit 114 may be a fingerprint reader having a touchscreen which uses a fingerprint of the user for verification purposes. The touch screen of the biometric verification unit 114 may exist in many different shapes and constructions, such as round, rectangular, and the like. The alarm device 110 may be configured such that when the user verifies his/her fingerprint in the biometric verification unit 114, the alarm device 110 may transmit the panic signal to the control panel 104 associated therewith. In the alarm device 110, the biometric verification unit 114 may be located inside a raised surface 116 so that the user can easily locate the biometric verification unit 114 in the housing 112 with the need of looking at the alarm device 110. This may be helpful in emergency like situations when the user may wish to discretely activate the alarm without brining into notice of another person, like a burglar, present in the same room.

Figure 3:
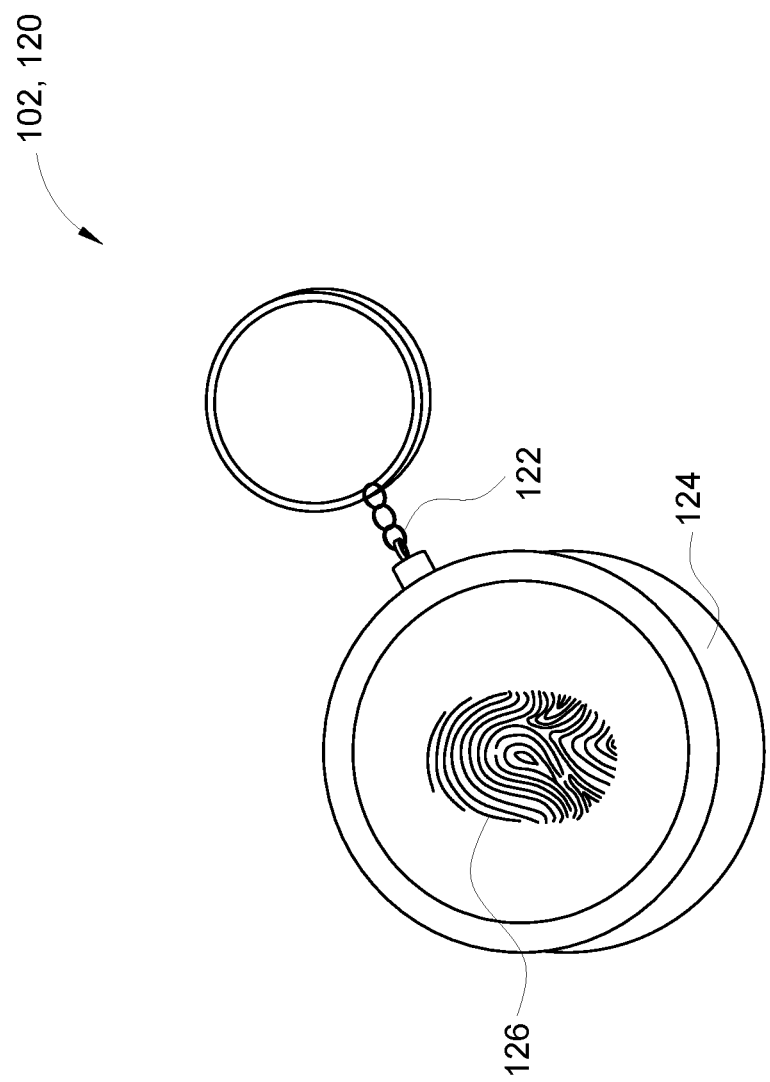
FIG. 3 illustrates a diagrammatic view of an alarm device 102 which is portable to be carried by the user, in accordance with one or more embodiments of the present invention.

FIG. 3 illustrates a diagrammatic view of the alarm device 102, in accordance with a second embodiment of the present disclosure. In the present embodiment, the alarm device 102 is in the form of a key fob based alarm device 120. The alarm device 120 is shown in the form of a keychain with a chain and ring assembly 122 for holding user's keys and the like; however, such chain and ring assembly 122 shall not be construed as limiting to the disclosure. Further, as illustrated, the alarm device 120 includes a casing 124 on to which a biometric verification unit 126 may be provided. The casing 124 has been shown to be in circular shape; however, the casing 124 may be designed and customized in other suitable shapes as per the choice of the user without any limitations. It may be contemplated that the alarm device 102 can be used as an alternative to the alarm device 110; for example, in indoor spaces, in case of the alarm device 110 cannot be activated due to some reasons, such as the burglar present in the same room.

The biometric verification unit 126 may be one of a known type which recognizes the fingerprints, face, eyes, skin texture, voice or other sound, of the user preconfigured therein. In an embodiment, the biometric verification unit 126 is a fingerprint reader having a touchscreen which uses a fingerprint of the user for verification purposes. The touch screen of the biometric verification unit 126 may exist in many different shapes and constructions, such as round, rectangular, and the like. The alarm device 120 may be configured such that when the user verifies his/her fingerprint in the biometric verification unit 126, the alarm device 120 may transmit the panic signal to the control panel 104 associated therewith. For this purpose, the alarm device 120 may include wireless communication means, like a Bluetooth chip which may provide connection with the user's smartphone usually carried by the user to send the panic signal to the remotely located control panel 104 associated with the alarm device 120. The alarm device 10 may include electrical components including a battery (not shown) as an electrical power supply for the wireless communication means and the biometric verification unit 126. The battery may include battery, such as a non-rechargeable lithium battery used in wristwatches. Alternatively, the battery may be rechargeable battery.

In an embodiment, the alarm device 120 also includes a location-based technology along with the ability to communicate with the security agency upon verification of the user by the biometric verification unit 126 in order to provide the panic signal thereto. Thus, the alarm device 120, in addition to the panic signal, may also share the location coordinate of the user with the assigned security agency, so that the personnel of the security agency may easily track the user in case of any emergency. In some examples, a speaker may be manifested with the alarm device 120 to provide an additional level of security by emitting an audible alarm. Upon transmission of panic signal to said local authorities, the alarm device 120 further transmits an electronic file containing biographical and/or medical information about the end user.

Figure 4:
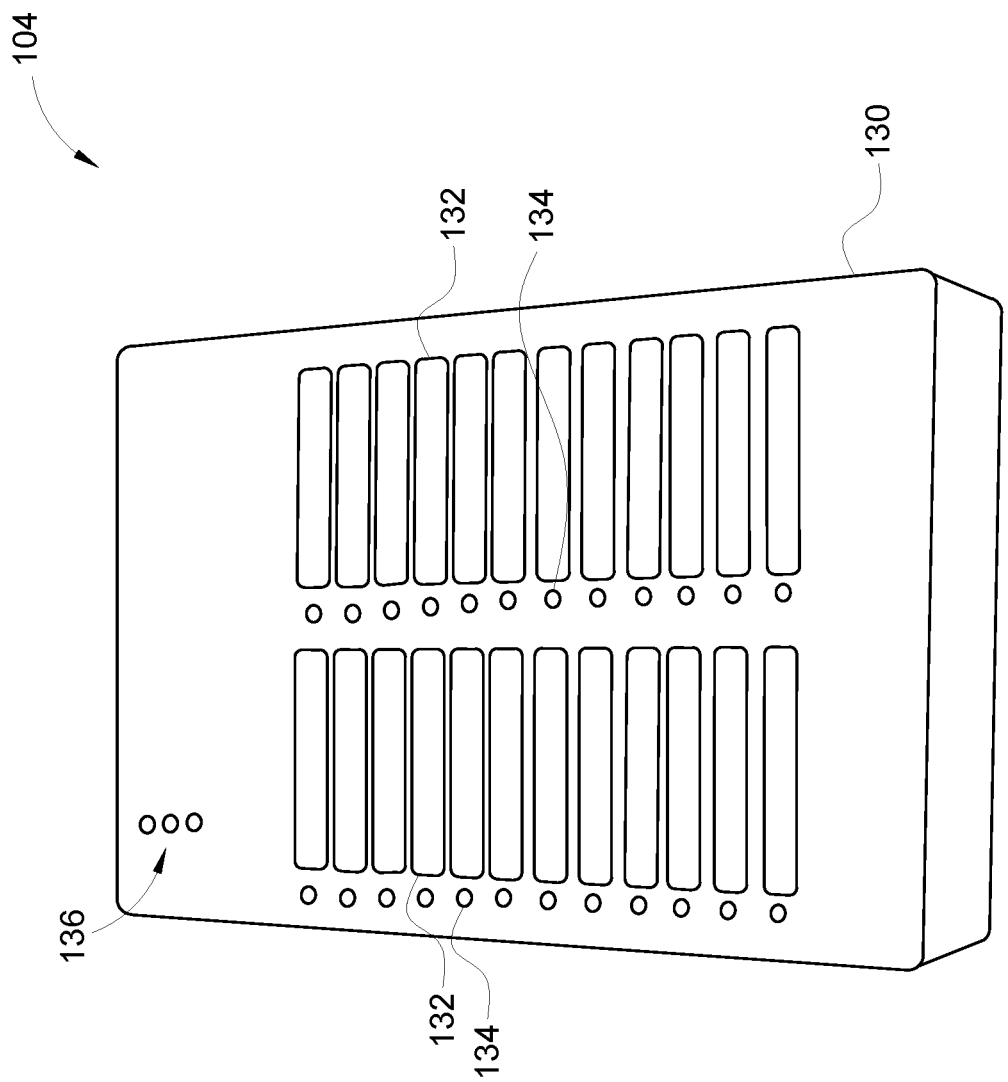
FIG. 4 illustrates a diagrammatic view of a control panel 104 adapted to display status of multiple alarm devices 102, in accordance with one or more embodiments of the present invention.

FIG. 4 illustrates a diagrammatic view of the control panel 104. As illustrated, the control panel 104 includes a housing 130 which is shown to be rectangular in shape; however, other shapes may be contemplated without any limitations. The control panel 104 provides labels 132 which corresponds to various alarm devices 102 for multiple users and/or users' premises (or rooms/zones in the user's premises) that are associated with the alarm system 100. For example, the labels 132 may be like "Room 1", "Room 2" and so on. Further, the control panel 104 includes lights 134, such as LEDs, provided next to each of the label 130. In case of receiving the panic signal from the alarm device 102, the control panel 104 may start blinking the light 134 next to the label 132 corresponding to that alarm device 102 from which the panic signal is received. Further, in some examples, the control panel 104 may generate an audible alarm for alerting the security personnel monitoring the control panel 104. The control panel 104 may also include a panel 136 having multiple lights to indicate status of connectivity of the control panel 104 with the various alarm devices 102, in the alarm system 100. It may be understood that the control panel 104 may be preconfigured to associate each label with one of the corresponding alarm device 102, in the alarm system 100 of the present disclosure. The control panel 104 may be installed in a central security room, such as a security room of a residential building or an office, or in headquarters of the security agency contracted by the user(s) of the alarm system 100. In some cases, the control panel 104 may also be installed in a local police station. Using the control panel 104, the security personnel can quickly glance and check for any panic signal that may have been generated by any of the alarm devices 102 that are associated with the alarm system 100 of the present disclosure.

The alarm system 100 of the present disclosure allows to verify the user and only allow the verified user to control activation of the alarm. Thus, the alarm system 100 may help to reduce incidence of false alarms that may have been activated advertently or inadvertently by people other than the user who is given the permission for activation of the alarm. In some examples, the alarm system 100 may be configured to generate an alarm with a sound message which indicates the nature of the emergency and the like. The present alarm device 120 could easily be carried to locations other than the home, and could be used in a hotel room, dorm room, camper, tent or any other location a person may travel to. In some examples, the alarm device 102 may also incorporate manual switches (not shown) along with the biometric verification unit 114. The manual switches and the biometric verification unit 114 can be used in parallel, if preferred, so that the user can actuate the alarm device 102 by any one of the various means available, depending on what is possible under the circumstances of the emergency in progress.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense in any manner.

What is claimed is:

1. An alarm system comprising:
two or more devices each including an alarm housing, each of said two or more alarm devices includes a Bluetooth chip to provide connection with a user's smartphone to send a panic signal to a control panel which is remotely located;
said alarm housing includes a box mounted thereon, said box having four side perimeter walls extending away from said alarm housing, said box having an entirely open top face, said box including a base opposite said open top face;
a biometric verification unit mounted only on said base and entirely within said four perimeter walls;
each of said two or more alarm devices is configured to respectively generate the panic signal upon the user's verification at said biometric verification unit;
said control panel in remote communication with said two or more alarm devices to receive the respective generated said panic signal therefrom, said control panel further includes a housing with two or more labels mounted thereon, each of said two or more labels corresponding to said two or more alarm devices, said two or more labels being configured in two adjacent vertical columns extending a substantial length of said housing, said two or more labels allowing for easy reading and identifying of corresponding said two or more alarms devices respective generation of said panic signal;
said control panel comprising lights provided next to each of said two or more labels and is configured to generate an alert, on receipt of said panic signal respectively generated, to visually indicate the respective two or more alarm devices generating the panic signal and emit a sound that corresponds with different types of emergencies depending on the nature of the emergency taking place to indicate the type of emergency.

2. The alarm system of claim 1, wherein said two or more alarm devices and said control panel are disposed in communication with each other by electrical wires.

3. The alarm system of claim 1, wherein said two or more alarm devices comprise a portable casing, and wherein said biometric verification unit is located on the outside of said portable casing of said two or more alarm devices.

4. The alarm system of claim 1, wherein said control panel is configured to blink said lights next to said two or more labels corresponding to said two or more alarm devices which a panic signal is received.

5. The alarm system of claim 1, wherein said biometric verification unit is configured to utilize fingerprints of the user preconfigured therein for verification purposes.

6. The alarm system of claim 1, wherein said biometric verification unit is configured to utilize one or more of face, eyes, skin texture and voice of the user preconfigured therein for verification purposes.

7. The alarm system of claim 1, wherein said two or more alarm devices are further configured to send location coordinates of the user upon user's verification at said biometric verification unit.

* * * * *